United States Patent
Stein et al.

(10) Patent No.: US 7,082,452 B2
(45) Date of Patent: *Jul. 25, 2006

(54) GALOIS FIELD MULTIPLY/MULTIPLY-ADD/MULTIPLY ACCUMULATE

(75) Inventors: Yosi Stein, Sharon, MA (US); Haim Primo, Tikwa (IL); Yaniv Sapir, Rehovot (IL)

(73) Assignee: Analog Devices, Inc., Norwood, MA (US)

(*) Notice: Subject to any disclaimer, the term of this patent is extended or adjusted under 35 U.S.C. 154(b) by 622 days.

This patent is subject to a terminal disclaimer.

(21) Appl. No.: 10/228,526

(22) Filed: Aug. 26, 2002

(65) Prior Publication Data

US 2003/0110196 A1    Jun. 12, 2003

Related U.S. Application Data

(60) Provisional application No. 60/341,711, filed on Dec. 18, 2001, provisional application No. 60/341,635, filed on Dec. 18, 2001, provisional application No. 60/334,662, filed on Nov. 30, 2001, provisional application No. 60/334,510, filed on Nov. 30, 2001.

(51) Int. Cl.
    *G06F 7/00* (2006.01)
(52) U.S. Cl. .................................... 708/492
(58) Field of Classification Search ........... 708/491, 708/492; 714/784, 785
    See application file for complete search history.

(56) References Cited

U.S. PATENT DOCUMENTS

| | | | |
|---|---|---|---|
| 3,303,477 A | 2/1967 | Voigt | |
| 3,805,037 A | 4/1974 | Ellison | |
| 4,722,050 A | 1/1988 | Lee et al. | |
| 4,847,801 A | 7/1989 | Tong | |
| 4,852,098 A | 7/1989 | Brechard et al. | |
| 4,918,638 A | 4/1990 | Matsumoto et al. | |
| 5,095,525 A | 3/1992 | Almgren et al. | |
| 5,101,338 A | 3/1992 | Fujiwara et al. | |
| 5,214,763 A | 5/1993 | Blaner et al. | |
| 5,379,243 A | 1/1995 | Greenberger et al. | |
| 5,386,523 A | 1/1995 | Crook et al. | |
| 5,446,850 A | 8/1995 | Jeremiah et al. | |

(Continued)

FOREIGN PATENT DOCUMENTS

EP    1 246 389 A1    10/2002

OTHER PUBLICATIONS

Viktor Fischer, *Realization of the Round 2 AES Candidates Using Altera FPGA*, (Jan. 26, 2001) <http://csrc.nist.gov/CryptoToolkit/aes/roun2/conf3/papers/24-vfischer.pdf> (Micronic—Kosice, Slovakia).

(Continued)

*Primary Examiner*—Chuong D. Ngo
(74) *Attorney, Agent, or Firm*—Iandiorio & Teska

(57) ABSTRACT

A Galois field multiply/multiply-add/multiply-accumulate system includes a multiplier circuit for multiplying two polynomials with coefficients over a Galois field to obtain their product; a Galois field linear transformer circuit responsive to the multiplier circuit for predicting the modulo remainder of the polynomial product for an irreducible polynomial; a storage circuit for supplying to the Galois field linear transformer circuit a set of coefficient for predicting the modulo remainder for a predetermined irreducible polynomial; and a Galois field adder circuit for adding the product of the multiplier circuit with a third polynomial with coefficients over a Galois field for performing the multiplication and add operations in a single cycle.

8 Claims, 7 Drawing Sheets

U.S. PATENT DOCUMENTS

| | | | |
|---|---|---|---|
| 5,642,367 A * | 6/1997 | Kao | 714/784 |
| 5,689,452 A | 11/1997 | Cameron | |
| 5,696,941 A | 12/1997 | Jung | |
| 5,754,563 A | 5/1998 | White | |
| 5,768,168 A | 6/1998 | Im | |
| 5,832,290 A | 11/1998 | Gostin et al. | |
| 5,996,057 A | 11/1999 | Scales, III et al. | |
| 5,996,066 A | 11/1999 | Yung | |
| 5,999,959 A | 12/1999 | Weng et al. | |
| 6,049,815 A | 4/2000 | Lambert et al. | |
| 6,138,208 A | 10/2000 | Dhong et al. | |
| 6,199,086 B1 | 3/2001 | Dworkin et al. | |
| 6,199,087 B1 | 3/2001 | Blake et al. | |
| 6,223,320 B1 | 4/2001 | Dubey et al. | |
| 6,230,179 B1 | 5/2001 | Dworkin et al. | |
| 6,246,768 B1 | 6/2001 | Kim | |
| 6,317,763 B1 | 11/2001 | Vatinel | |
| 6,349,318 B1 | 2/2002 | Vanstone et al. | |
| 6,384,713 B1 | 5/2002 | Yu | |
| 6,389,088 B1 | 5/2002 | Blois et al. | |
| 6,434,662 B1 | 8/2002 | Greene et al. | |
| 6,587,864 B1 | 7/2003 | Stein et al. | |
| 6,738,794 B1 | 5/2004 | Stein et al. | |
| 2002/0041685 A1 | 4/2002 | McLoone et al. | |
| 2002/0147825 A1 | 10/2002 | Stein et al. | |
| 2003/0103626 A1 | 6/2003 | Stein et al. | |
| 2003/0105791 A1 | 6/2003 | Stein et al. | |
| 2003/0115234 A1 | 6/2003 | Stein et al. | |
| 2003/0133568 A1 | 7/2003 | Stein et al. | |
| 2003/0140211 A1 | 7/2003 | Stein et al. | |
| 2003/0140212 A1 | 7/2003 | Stein et al. | |
| 2003/0140213 A1 | 7/2003 | Stein et al. | |
| 2003/0149857 A1 | 8/2003 | Stein et al. | |

OTHER PUBLICATIONS

Máire McLoone and J.V. McCanny, *High Performance Single-Chip FPGA Rijndael Algorithm Implementation*, CHES 2001 Proc, LNCS 2162, 65-76 ( C.K. Koc et al. eds. May 16, 2001).

Elixent, *Changing the Electronic Landscape* (2001) <http://www.elixent.com> (elixent—Bristol, UK).

Elixent Application Note *JPEG Codec* (Dec. 9, 2002) <http://www.elixent.com/assets/jpeg-coder.pdf> (elixent—Bristol, UK).

V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnologie GmbH, *The XXP White Paper Release 2.1* (Mar. 27, 2002) <http://www.pactcorp.com/xneu/download/xpp_white_paper.pdf> (PACT XPP—Santa Clara, CA).

U.S. Appl. No. 10/440,330, filed May 16, 2003, Stein et al.
U.S. Appl. No. 10/395,620, filed Mar. 24, 2003, Stein et al.

* cited by examiner

GALOIS FIELD MULTIPLY/MULTIPLY-ADD/MULTIPLY ACCUMULATE

RELATED APPLICATIONS

This application claims priority of U.S. Provisional applications, entitled GF2-ALU, Stein et al., Ser. No. 60/334,662, filed Nov. 30, 2001 (AD-239J), GALOIS FIELD MULTIPLY ADD (MPA) USING GF2-ALU, Stein et al., Ser. No. 60/341,635, filed Dec. 18, 2001 (AD-299J), METHOD FOR DATA ENCRYPTION STANDARD (DES) USING GF2-ALU AND 8 WAY PARALLEL LUT, Stein et al., Ser. No. 60/341,711, filed Dec. 18, 2001 (AD-297J), and GALOIS FIELD MULTIPLIER SYSTEM, Stein et al., Ser. No. 60/334,510, filed Nov. 30, 2001 (AD-240J).

FIELD OF THE INVENTION

This invention relates to a Galois field multiply/multiply-add/multiply accumulate system which can perform a multiply/multiply-add/multiply accumulate operation in one cycle.

BACKGROUND OF THE INVENTION

Galois field Multiplication, Multiply-Add and Multiply-Accumulate operations are used in a number of applications. For example, in executing forwarded error control (FEC) coding schemes such as Reed-Solomon, sixteen syndromes must be calculated using polynomials over a Galois field. This is done recursively using Homer's rule. For example: $1+x+x^2+x^3+x^4$ can also be written recursively as $x(x(x(x+1)+1)+1)+1$ which requires a series of multiply-add operations. Multiply-accumulate operations are required in advance encryption standards (AES) cipher function for the MixColumn transformation where a matrix is multiplied by a vector. In very long instruction word (VLIW) processors there are a number of compute units e.g., multiplier, adder and shifter. Thus at any time while one value is undergoing multiplication, the product of the previous multiplication can be undergoing an add operation. This simultaneous operation or pipelining enables a long string of n values to be completely processed in only n+1 cycles instead of 2n cycles. However in smaller processors where one compute unit must do all the function, each value requires two cycles to accomplish multiply and add operations, thus 2n cycles are required to process a set of n values.

BRIEF SUMMARY OF THE INVENTION

It is therefore an object of this invention to provide an improved Galois field multiply/multiply-add/multiply-accumulate system.

It is a further object of this invention to provide such an improved Galois field multiply/multiply-add/multiply-accumulate system which can perform a multiply/multiply-add/multiply-accumulate operation in one cycle.

It is a further object of this invention to provide such an improved Galois field multiply/multiply-add/multiply-accumulate system which can achieve the increased performance without additional logic circuitry.

It is a further object of this invention to provide such an improved Galois field multiply/multiply-add/multiply-accumulate system which can perform either a multiply or multiply and add or multiply and accumulate operations in one cycle.

The invention results from the realization that an improved Galois field multiply/multiply-add/multiply-accumulate system which performs either multiply or multiply and add or multiply and accumulate operations in one cycle with little or no additional logic circuitry can be achieved using a Galois field adder circuit, polynomial multiplier circuit that multiplies binary polynomials in $GF(2^n)$, Galois field linear transformer circuit, and storage circuit, for adding the product of first and second polynomials from the multiplier with a third polynomial in a single cycle.

This invention features a Galois field multiply/multiply-add/multiply-accumulate system including a multiplier circuit for multiplying two polynomials with coefficients over a Galois field to obtain their product and a Galois field linear field transformer circuit responsive to the multiplier circuit for predicting the modulo remainder of the polynomial product for an irreducible polynomial. A storage circuit supplies to the Galois field linear transformer circuit a set of coefficients for predicting the modulo remainder for a predetermined irreducible polynomial. A Galois field adder circuit adds the product of the multiplier circuit with a third polynomial with coefficients over a Galois field for performing the multiplication and add operations in a single cycle.

In the preferred embodiment, the third polynomial may be the additive identity polynomial and the add operation may be nulled. The multiplication product may be recursively fed back as the third polynomial and the adder circuit may perform a multiply-accumulate operation. The multiplication product may be delivered to a first output register and the multiply-add/multiply-accumulate result may be delivered to a second output register. The Galois field adder circuit may include a plurality of adder cells associated with the Galois field linear transformer circuit for combining the third polynomial with the product of the first and second in one cycle.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
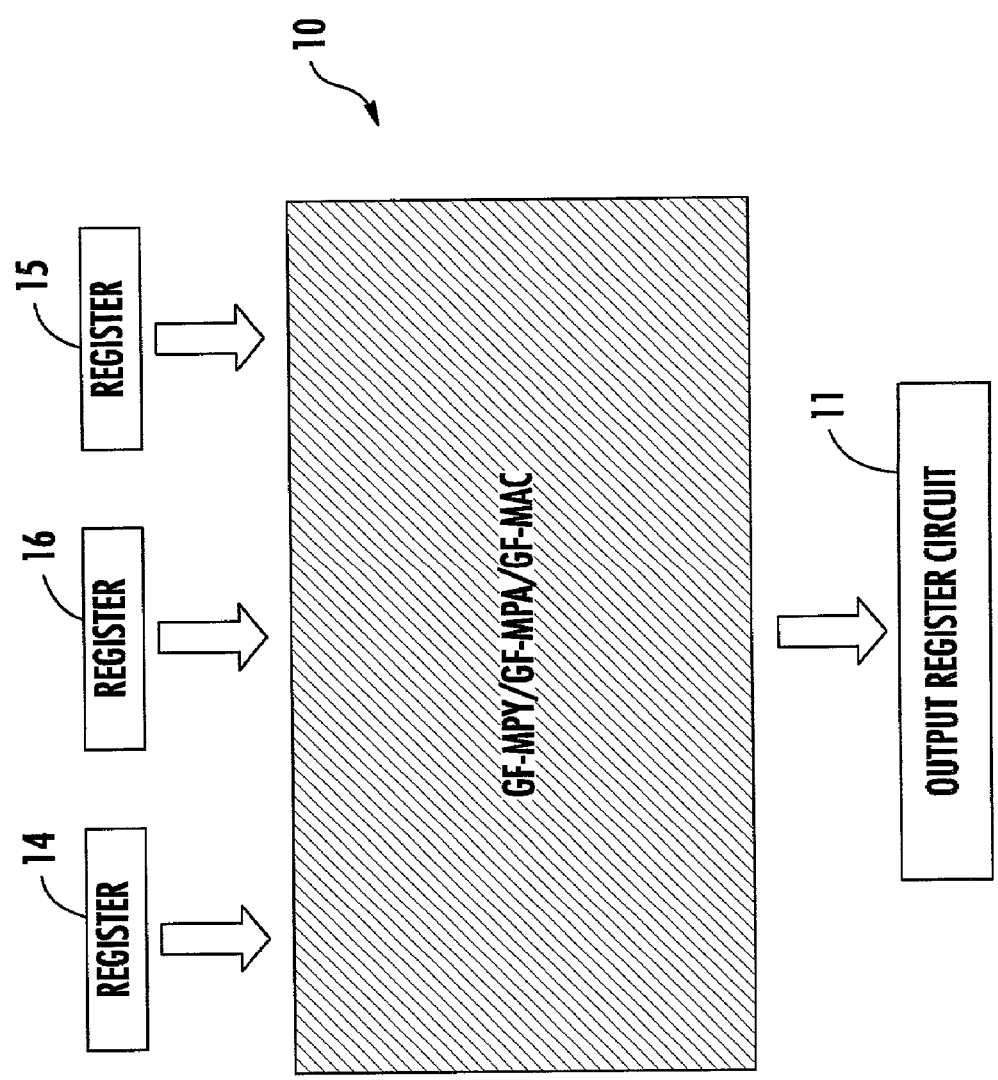
FIG. 1 is a simplified block diagram of a Galois field multiply/multiply-add/multiply-accumulate system according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a Galois field multiply/multiply-add/multiply-accumulate system 10 which can selectively multiply the values in registers 14 and 16 and provide their product to output register 11 or multiply the values in registers 14 and 16 and sum their product with the values in register 15 and provide that result to output register 11.

Figure 2:
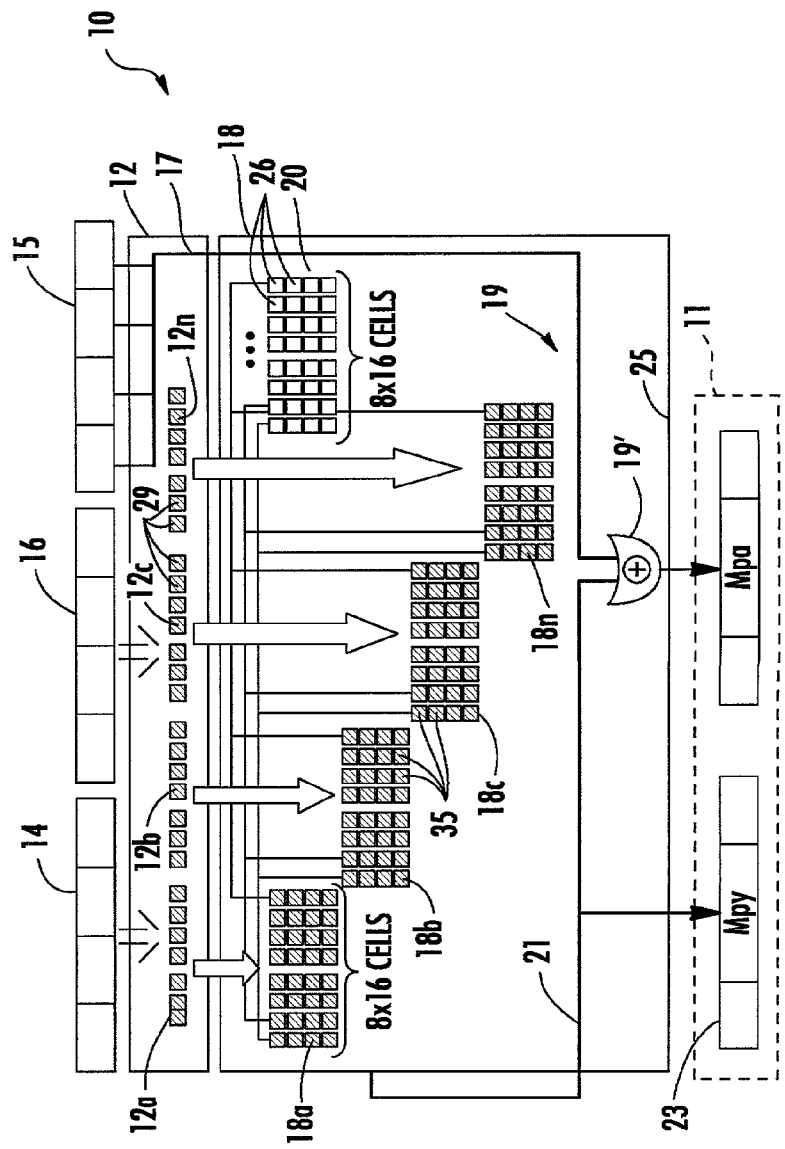
FIG. 2 is a more detailed diagram of the Galois field multiply/multiply-add/multiply-accumulate system of FIG. 1.

Before explanation of an embodiment of the invention in FIG. 2 et seq. a brief discussion of the properties and operations of Galois field multiplication and addition follows.

A Galois field GF(n) is a set of elements on which two binary operations can be performed. Addition and multiplication must satisfy the commutative, associative and distributive laws. A field with a finite number of elements is a finite field. An example of a binary field is the set $\{0,1\}$ under modulo 2 addition and modulo 2 multiplication and is denoted GF(2). The modulo 2 addition and multiplication operations are defined by the tables shown in the following figure. The first row and the first column indicate the inputs to the Galois field adder and multiplier. For e.g. 1+1=0 and 1*1=1.

Modulo 2 Addition (XOR)

| + | 0 | 1 |
|---|---|---|
| 0 | 0 | 1 |
| 1 | 1 | 0 |

Modulo 2 Multiplication (AND)

| * | 0 | 1 |
|---|---|---|
| 0 | 0 | 0 |
| 1 | 0 | 1 |

In general, if p is any prime number then it can be shown that GF(p) is a finite field with p elements and that $GF(p^m)$ is an extension field with $p^m$ elements. In addition, the various elements of the field can be generated as various powers of one field element, $\alpha$, by raising it to different powers. For example GF(256) has 256 elements which can all be generated by raising the primitive element, $\alpha$, to the 256 different powers.

In addition, polynomials whose coefficients are binary belong to GF(2). A polynomial over GF(2) of degree m is said to be irreducible if it is not divisible by any polynomial over GF(2) of degree less than m but greater than zero. The polynomial $F(X)=X^2+X+1$ is an irreducible polynomial as it is not divisible by either X or X+1. An irreducible polynomial of degree m which divides $X^{2m-1}+1$, is known as a primitive polynomial. For a given m, there may be more than one primitive polynomial. An example of a primitive polynomial for m=8, which is often used in most communication standards is $F(X)=x^8+x^4+x^3+x^2+1$.

Galois field addition is easy to implement in software, as it is the same as modulo addition. For example, if 29 and 16 are two elements in $GF(2^8)$ then their addition is done simply as an XOR operation as follows: $29(11101) \oplus 16 (10000) = 13(01101)$.

Galois field multiplication on the other hand is a bit more complicated as shown by the following example, which computes all the elements of $GF(2^4)$, by repeated multiplication of the primitive element $\alpha$. To generate the field elements for $GF(2^4)$ a primitive polynomial G(x) of degree m=4 is chosen as follows $G(x)=X^4+X+1$. In order to make the multiplication be modulo so that the results of the multiplication are still elements of the field, any element that has the fifth bit set is brought into a 4-bit result using the following identity $F(\alpha)=\alpha^4+\alpha+1=0$. This identity is used repeatedly to form the different elements of the field, by setting $\alpha^4=1+\alpha$. Thus the elements of the field can be enumerated as follows:

$\{0, 1, \alpha, \alpha^2, \alpha^3, 1+\alpha, \alpha+\alpha^2, \alpha^2+\alpha^3, 1+\alpha+\alpha^3, \ldots 1+\alpha^3\}$ since $\alpha$ is the primitive element for $GF(2^4)$ it can be set to 2 to generate the field elements of $GF(2^4)$ as $\{0,1,2,4,8,3,6,12,11 \ldots 9\}$.

It can be seen that Galois field polynomial multiplication can be implemented in two basic steps. The first is a calculation of the polynomial product $c(x)=a(x)*b(x)$ which is algebraically expanded, and like powers are collected (addition corresponds to an XOR operation between the corresponding terms) to give c(x).

For example $c(x)=(a_3x^3+a_2x^2+a_1x^1+a_0)*(b_3x^3+b_2x^3+b_1x^1+b_0)$ $C(x)=c_6x^6+c_5x^5+c_4x^4+c_3x^3+c_2x^2+c_1x^1+c_0$ where:

Chart I $c_0 = a_0 * b_0$
$c_1 = a_1 * b_0 \oplus a_0 * b_1$
$c_2 = a_2 * b_0 \oplus a_1 * b_1 \oplus a_0 * b_2$
$c_3 = a_3 * b_0 \oplus a_2 * b_1 \oplus a_1 * b_2 \oplus a_0 * b_3$
$c_4 = a_3 * b_1 \oplus a_2 * b_2 \oplus a_1 * b_3$
$c_5 = a_3 * b_2 \oplus a_2 * b_3$
$c_6 = a_3 * b_3$ The second is the calculation of d(x)=c(x) modulo p(x) where p(x) is an irreducible polynomial.

To illustrate, multiplications are performed with the multiplication of polynomials modulo an irreducible polynomial. For example: (if $p(x)=x^8+x^4+x^3+x+1$)

$\{57\}*\{83\}=\{c1\}$ because,

Each of these $\{*\}$ bytes is the concatenation of its individual bit values (0 or 1) in the order $\{b7, b6, b5, b4, b3, b2, b1, b0\}$ and are interpreted as finite elements using polynomial representation:

$b_7x^7+b_6x^6+b_5x^5+b_4x^4+b_3x^3+b_2x^2+b_1x^1+b_0x^0=\Sigma b_ix^i$

First Step

-continued $$(x^6 + x^4 + x^2 x + 1)(x^7 + x + 1) = x^{13} \oplus x^{11} \oplus x^9 \oplus x^8 \oplus x^7$$
$$x^7 \oplus x^5 \oplus x^3 \oplus x^2 \oplus x$$
$$x^6 \oplus x^4 \oplus x^2 \oplus x \oplus x$$
$$= x^{13} \oplus x^{11} \oplus x^9 \oplus x^8 \oplus x^6 \oplus x^5 \oplus x^4 \oplus x^3 \oplus 1$$

Second Step $$x^{13} + x^{11} + x^9 + x^8 + x^6 + x^5 + x^4 + x^3 + 1 \text{ modulo } (x^8 + x^4 + x^3 + x + 1) = x^7 + x^6 + 1$$

An improved Galois field multiplier system 10, FIG. 2, according to this invention includes a binary polynomial multiplier circuit 12 for multiplying two binary polynomials in register 14 with the polynomials in register 16 to obtain their product is given by the sixteen-term polynomial c(x) defined as chart II. Multiplier circuit 12 actually includes a plurality of multiplier cells 12a, 12b, 12c . . . 12n.

Chart II $c14 = a7 * b7$ $c13 = a7 * b6 \oplus a6 * b7$ $c12 = a7 * b5 \oplus a6 * b6 \oplus a5 * b7$ $c11 = a7 * b4 \oplus a6 * b5 \oplus a5 * b6 \oplus a4 * b7$ $c10 = a7 * b3 \oplus a6 * b4 \oplus a5 * b5 \oplus a4 * b6 \oplus a3 * b7$ $c9 = a7 * b2 \oplus a6 * b3 \oplus a5 * b4 \oplus a4 * b5 \oplus a3 * b6 \oplus a2 * b7$ $c8 = a7 * b1 \oplus a6 * b2 \oplus a5 * b3 \oplus a4 * b4 \oplus a3 * b5 \oplus a2 * b6 \oplus a1 * b7$ $c7 = a7 * b0 \oplus a6 * b1 \oplus a5 * b2 \oplus a4 * b3 \oplus a3 * b4 \oplus a2 * b5 \oplus a1 * b6 \oplus a0 * b7$ $c6 = a6 * b0 \oplus a5 * b1 \oplus a4 * b2 \oplus a3 * b3 \oplus a2 * b4 \oplus a1 * b5 \oplus a0 * b6$ $c5 = a5 * b0 \oplus a4 * b1 \oplus a3 * b2 \oplus a2 * b3 \oplus a1 * b4 \oplus a0 * b5;$ $c4 = a4 * b0 \oplus a3 * b1 \oplus a2 * b2 \oplus a1 * b3 \oplus a0 * b4$ $c3 = a3 * b0 \oplus a2 * b1 \oplus a1 * b2 \oplus a0 * b3$ $c2 = a2 * b0 \oplus a1 * b1 \oplus a0 * b2$ $c1 = a1 * b0 \oplus a0 * b1$ $c0 = a0 * b0$ Each term includes an AND function as represented by an * and each pair of terms are combined with a logical exclusive OR as indicated by a $\oplus$. This product is submitted to a Galois field linear transformer circuit 18 which may include a number of Galois field linear transformer units 18a, 18b, 18c . . . 18n each composed of 16×8 cells 35, which respond to the product produced by the multiplier circuit 12 to predict in one cycle the modulo remainder of the polynomial product for a predetermined irreducible polynomial. The multiplication is performed in units 18a, 18b, 18c . . . 18n. The construction and operation of this Galois field linear transformer circuit and each of its transformer units and its multiplier function is explained more fully in U.S. Pat. No. 6,587,864 B1 entitled GALOIS FIELD LINEAR TRANSFORMER, to Stein et al. and GALOIS FIELD MULTIPLIER SYSTEM, Stein et al., Ser. No. 60/334,510, filed Nov. 30, 2001 (AD-240J) each of which is incorporated herein in its entirety by this reference. Each of the Galois field linear transformer units predicts in one cycle the modulo remainder by dividing the polynomial product by an irreducible polynomial. That irreducible polynomial may be, for example, any one of those shown in Chart III.

Chart III
GF($2^1$)
0x3 (x+1)
GF($2^2$)
0x7 ($x^2$+x+1)
GF($2^3$)
0xB ($x^3$+x+1)
0xD ($x^3$+$x^2$+1)
GF($2^4$)
0x13 ($x^4$+x+1)
0x19 ($x^4$+$x^3$+1)
GF($2^5$)
0x25 ($x^5$+$x^2$+1)
0x29 ($x^5$+$x^3$+1)
0x2F ($x^5$+$x^3$+$x^2$+x+1)
0x37 ($x^5$+$x^4$+$x^2$+x+1)
0x3B ($x^5$+$x^4$+$x^3$+x+1)
0x3D ($x^5$+$x^4$+$x^3$+$x^2$+1)
GF($2^6$)
0x43 ($x^6$+x+1)
0x5B ($x^6$+$x^4$+$x^3$+x+1)
0x61 ($x^6$+$x^5$+1)
0x67 ($x^6$+$x^5$+$x^2$+x+1)
0x6D ($x^6$+$x^5$+$x^3$+$x^2$+1)
0x73 ($x^6$+$x^5$+$x^4$+x+1)
GF($2^7$)
0x83 ($x^7$+x+1)
0x89 ($x^7$+$x^3$+1)
0x8F ($x^7$+$x^3$+$x^2$+x+1)
0x91 ($x^7$+$x^4$+1)
0x9D ($x^7$+$x^4$+$x^3$+$x^2$+1)
0xA7 ($x^7$+$x^5$+$x^2$+x+1)
0xAB ($x^7$+$x^5$+$x^3$+x+1)
0xB9 ($x^7$+$x^5$+$x^4$+$x^3$+1)
0xBF ($x^7$+$x^5$+$x^4$+$x^3$+$x^2$+x+1)
0xC1 ($x^7$+$x^6$+1)
0xCB ($x^7$+$x^6$+$x^3$+x+1)
0xD3 ($x^7$+$x^6$+$x^4$+x+1)
0xE5 ($x^7$+$x^6$+$x^5$+$x^2$+1)
0xF1 ($x^7$+$x^6$+$x^5$+$x^4$+1)
0xF7 ($x^7$+$x^6$+$x^5$+$x^4$+$x^2$+x+1)

0xFD ($x^7+x^6+x^5+x^4+x^3+x^2+1$)
GF($2^8$)
0x11D ($x^8+x^4+x^3+x^2+1$)
0x12B ($x^8+x^5+x^3+x+1$)
0x12D ($x^8+x^5+x^3+x^2+1$)
0x14D ($x^8+x^6+x^3+x^2+1$)
0x15F ($x^8+x^6+x^4+x^3+x^2+x+1$)
0x163 ($x^8+x^6+x^5+x+1$)
0x165 ($x^8+x^6+x^5+x^2+1$)
0x169 ($x^8+x^6+x^5+x^3+1$)
0x171 ($x^8+x^6+x^5+x^4+1$)
0x187 ($x^8+x^7+x^2+x+1$)
0x18D ($x^8+x^7+x^3+x^2+1$)
0x1A9 ($x^8+x^7+x^5+x^3+1$)
0x1C3 ($x^8+x^7+x^6+x+1$)
0x1CF ($x^8+x^7+x^5+x^3+x^2+x+1$)
0x1E7 ($x^8+x^7+x^6+x^5+x^2+x+1$)
0x1F5 ($x^8+x^7+x^5+x^4+x^2+1$)

The Galois field multiplier presented where GF($2^8$) is capable of performing with all powers $2^8$ and under is shown in Chart III. For lower polynomials the coefficients at higher than the chosen power will be zeros, e.g., if GF($2^5$) is implemented coefficents between GF($2^5$) and GF($2^8$) will be zero. Then the prediction won't be made above that level.

Figure 3:
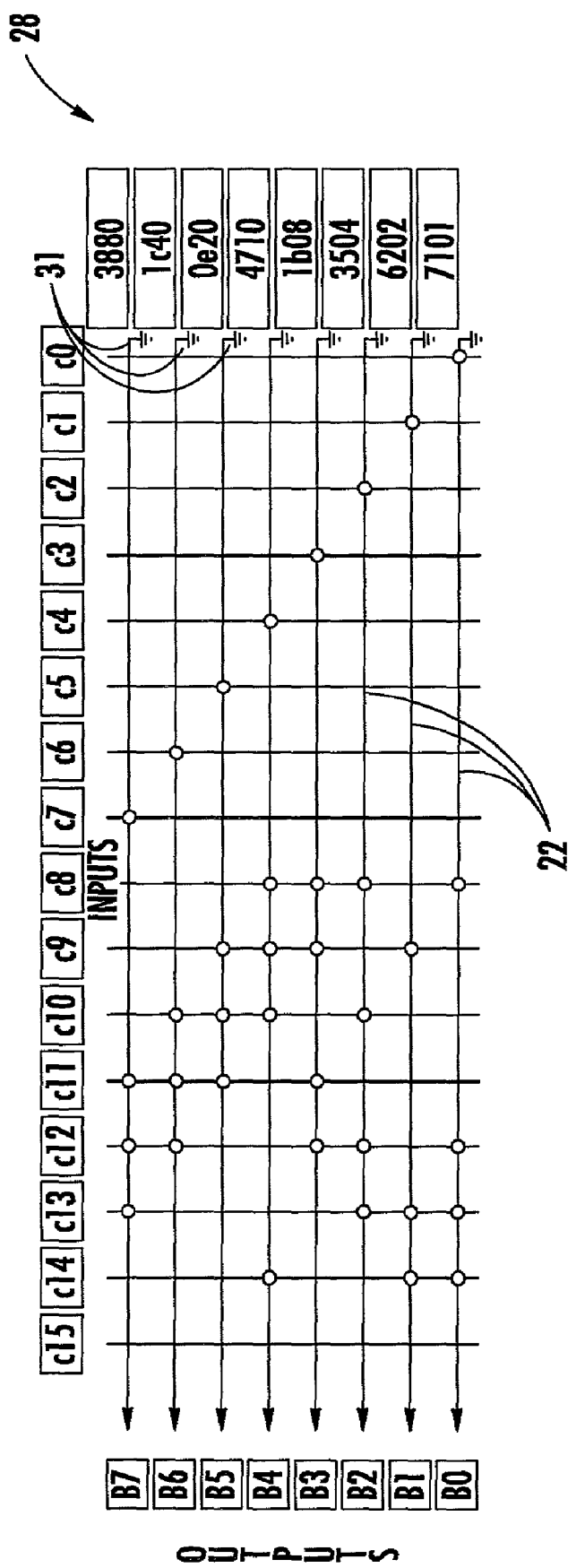
FIG. 3 is a schematic diagram of Galois field linear transformer unit of FIG. 1 showing the programming of its cells and those of the associated storage cells to achieve the predicted result.

For this particular example, the irreducible or primitive polynomial 0x11D in group GF($2^8$) has been chosen. A storage circuit 20 with storage cells 26 supplies to the Galois field linear transformer circuit a set of coefficients for predicting the modulo remainder for that particular primitive or irreducible polynomial. For a Galois field GF($2^8$) with primitive polynomial 0x11D the storage circuit 20 produces the matrix setup values as shown in FIG. 3 where each crossing of lines, e.g., 22 represents a cell 35 of linear transformer units 18a, 18b, . . . 18n. Each enlarged dot 24 indicates a cell which has been enabled by the presence of a 1 in the associated storage cell 26 in storage circuit 20. The programming of the storage cells 26 of circuit 20 to provide the proper pattern of 1's to produce the prediction in one cycle of the modulo operation of the irreducible polynomial is shown in column 28. The matrix shown in FIG. 3 is an array of sixteen inputs and eight outputs.

An example of the GF multiplication according to this invention occurs as follows:

| Before GF( ) multiplication; Polynomial 0x11d | After GF8( ) multiplication; Polynomial 0x11d |
|---|---|
| 45 23 00 01h | 45 23 00 01h |
| GF( ) | GF( ) |
| 57 34 00 01h | 57 34 00 01h |
| xx xx xx xxh | 72 92 00 01h |

Figure 9:
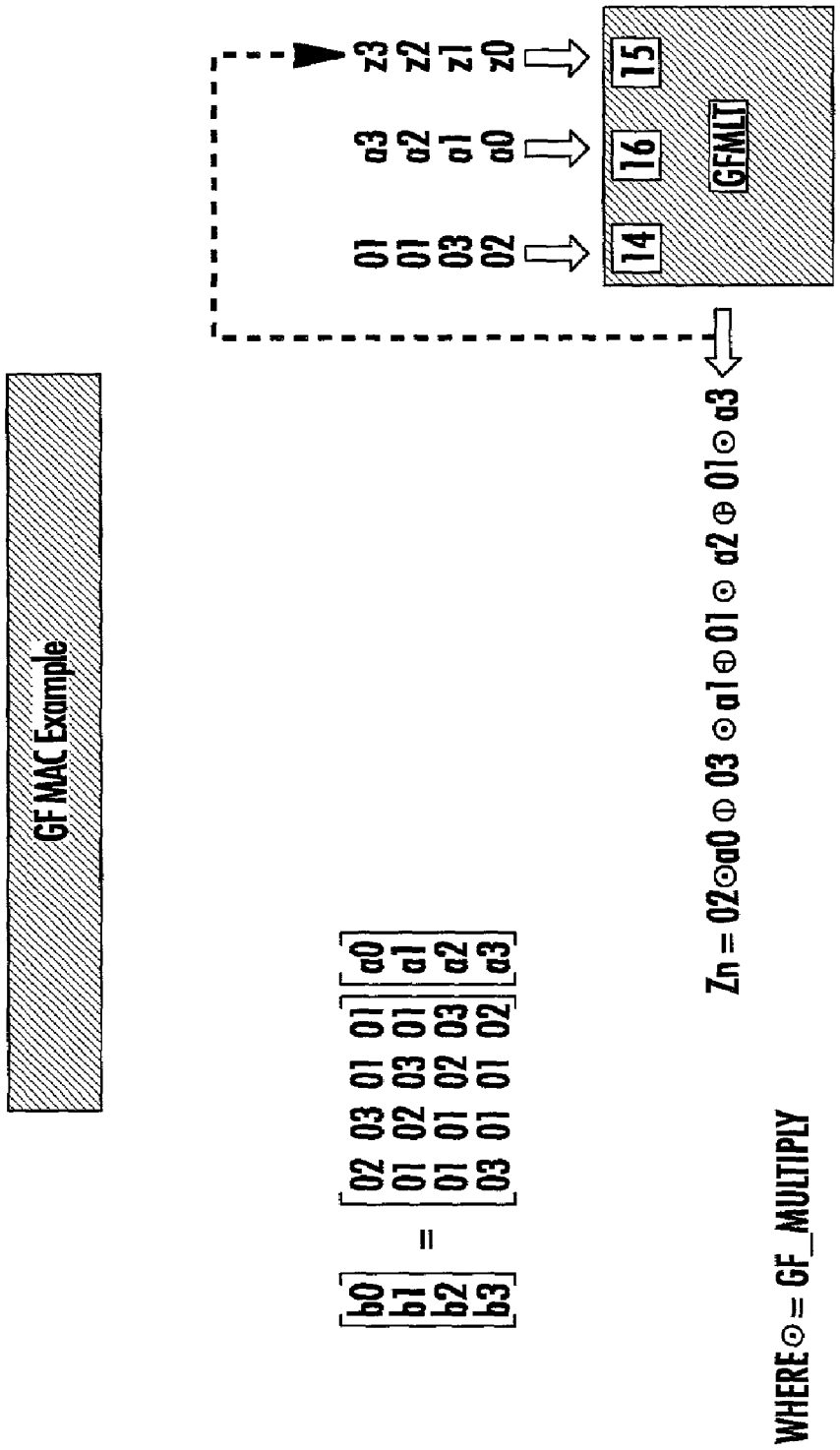
FIG. 9 Multiply and accumulate (MAC) example according to this invention.
Figure 10:
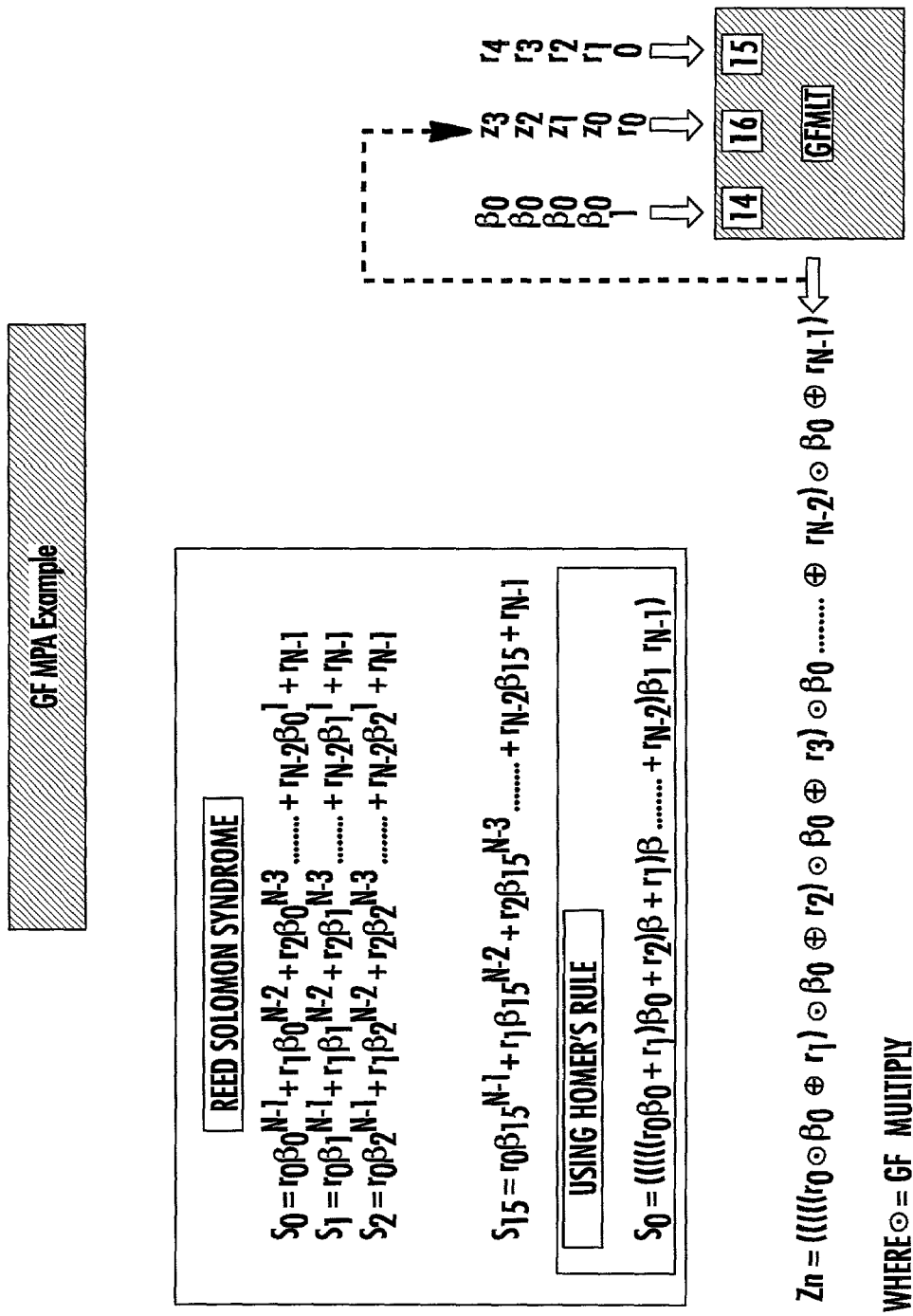
FIG. 10 Multiply and add (MPA) example according to this invention.

In accordance with this invention, FIG. 2, there is a third register 15 which includes a third polynomial with coefficients over a Galois field. Typically, each of the registers 14, 16, and 15 may include four byte sections of 8 bits each so that each register contains four bytes or 32 bits total. The output from register 15 is delivered to Galois field adder circuit 19 which in this embodiment includes bus 17 and number of exclusive OR gates 19, one for each bit of bus 17. The product obtained in Galois field linear transformer circuit 18 is delivered on bus 21 so that the simple product of the multiplication may be available in the Mpy register 23 in output register circuit 11 whereas the combination of the product on bus 21 and the third polynomial is combined in adder circuit 19 including exclusive OR circuit 19' to provide the multiply and add or multiply and accumulate result in Mpa register 25 of output register circuit 11. For example FIG. 9, if the output of the Galois field multiplier system 10 is recursively feed back at input register circuit 15 while two new values are passed to input registers circuit 14 and 16 a Multiply and accumulate (MAC) is performed. On the other hand FIG. 10, if the output of the Galois field multiplier system 10 is recursively feed back at input register circuit 14 while two new values are passed to input registers circuit 15 and 16 a Multiply and add (MPA) is performed. In this way the entire multiplication of the polynomials in registers 14 and 16 and their addition with the polynomial in register 15 is all accomplished in one cycle of operation.

Figure 4:
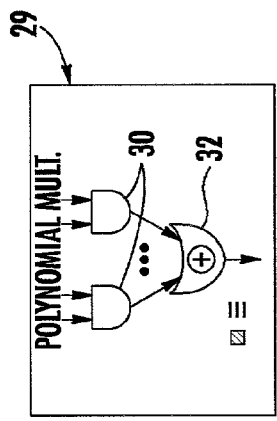
FIG. 4 is a schematic diagram of a polynomial multiplier cell that multiplies binary polynomials in $GF(2^n)$ for the multiplier circuit of FIG. 1.
Figure 5:
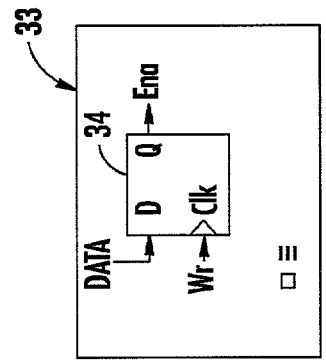
FIG. 5 is a schematic diagram of a storage device for the storage circuit of FIG. 1.
Figure 6:
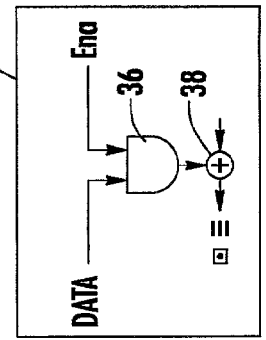
FIG. 6 is a schematic diagram of a cell of the Galois field linear transformer circuit of FIG. 1.

Each cell 29, FIG. 2, of the polynomial multiplier circuit 12 includes a number of AND gates 30, FIG. 4, one for each term of the polynomial product and an exclusive OR gate 32 one for each pair of terms in the polynomial product. AND gate 30 executes the multiplication while exclusive OR gate 32 effects the summation. Each cell 35, FIG. 2, in the Galois field linear transformer circuit 18 receives an input from the previous cell and provides an output to the next cell. The first cell input is grounded at 31 as shown in FIG. 3. Each cell, 33, FIG. 5, of storage circuit 20 includes a flip-flop 34 having a data, D, input, a Wr, Clock, input, and a Q output, enable. Each cell 35 of the Galois field linear transformer circuit and each of the one or more units of the Galois field linear transformer circuit includes a cell 35, FIG. 4, having an AND gate 36, FIG. 6, and an exclusive OR gate 38, as also explained in U.S. Pat. No. 6,587,864 entitled GALOIS FIELD LINEAR TRANSFORMER, to Stein et al., incorporated herein in its entirety. In each of the cells 29, 33, and 35 the specific implementations shown are not a limitation of the invention. For example the storage device 33 need not be implemented by a flip-flop, any other storage device could be used. In FIGS. 2 and 4 cells 29 and 35 respectively need AND functions and exclusive OR functions, but these may be performed in a number of different ways not requiring a specific XOR gate or AND gate as long as these are logic circuits that function in a Boolean sense like an XOR gate and AND gate. For example, the AND function can be achieved without a specific AND gate using a 2:1 input multiplexor to perform the AND function.

Figure 7:
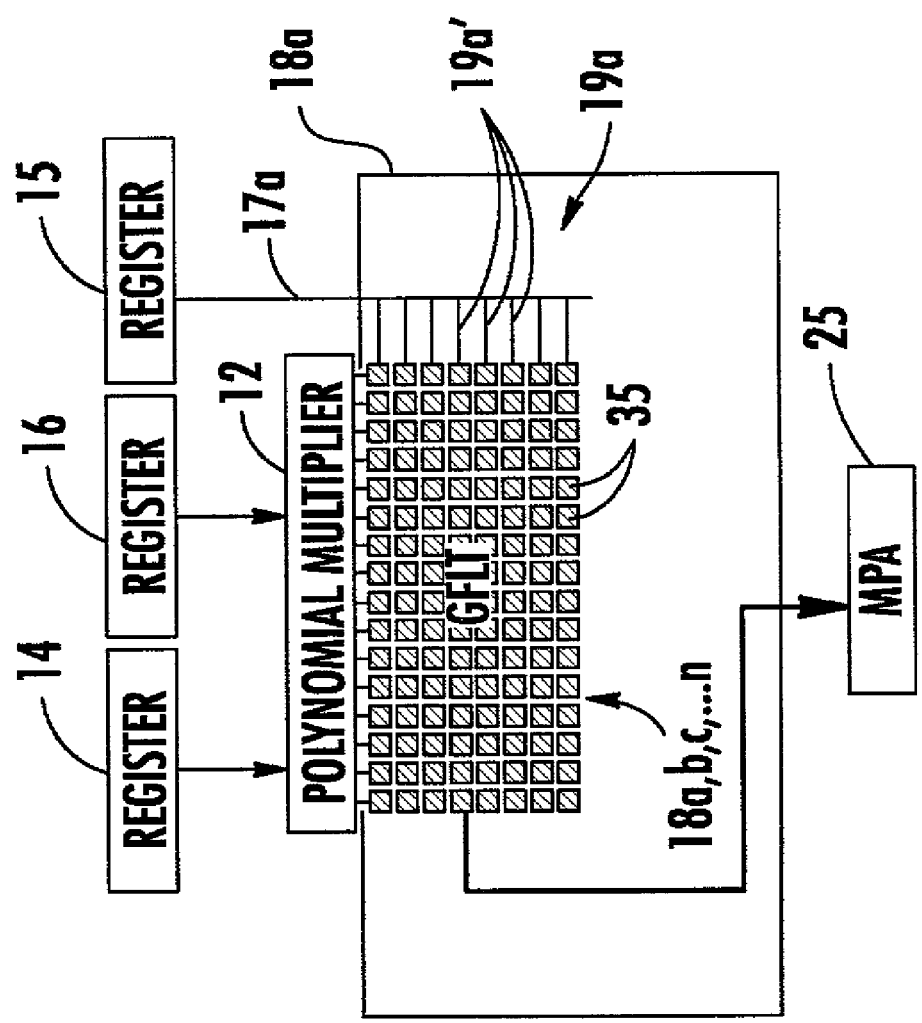
FIG. 7 is a diagram similar to FIG. 2 of another construction of the Galois field multiply/multiply-add/multiply-accumulate system according to this invention.

Although in FIG. 2 the embodiment shown uses adder circuit 19, which includes an actual logic circuit, exclusive OR circuit 19', this is not a necessary limitation of the invention. The invention can be made even more simply as shown in FIG. 7 where the polynomial value in register 15 is delivered directly on line 17a to the first of cells 35 in Galois field linear transformer circuit 18.

Figure 8:
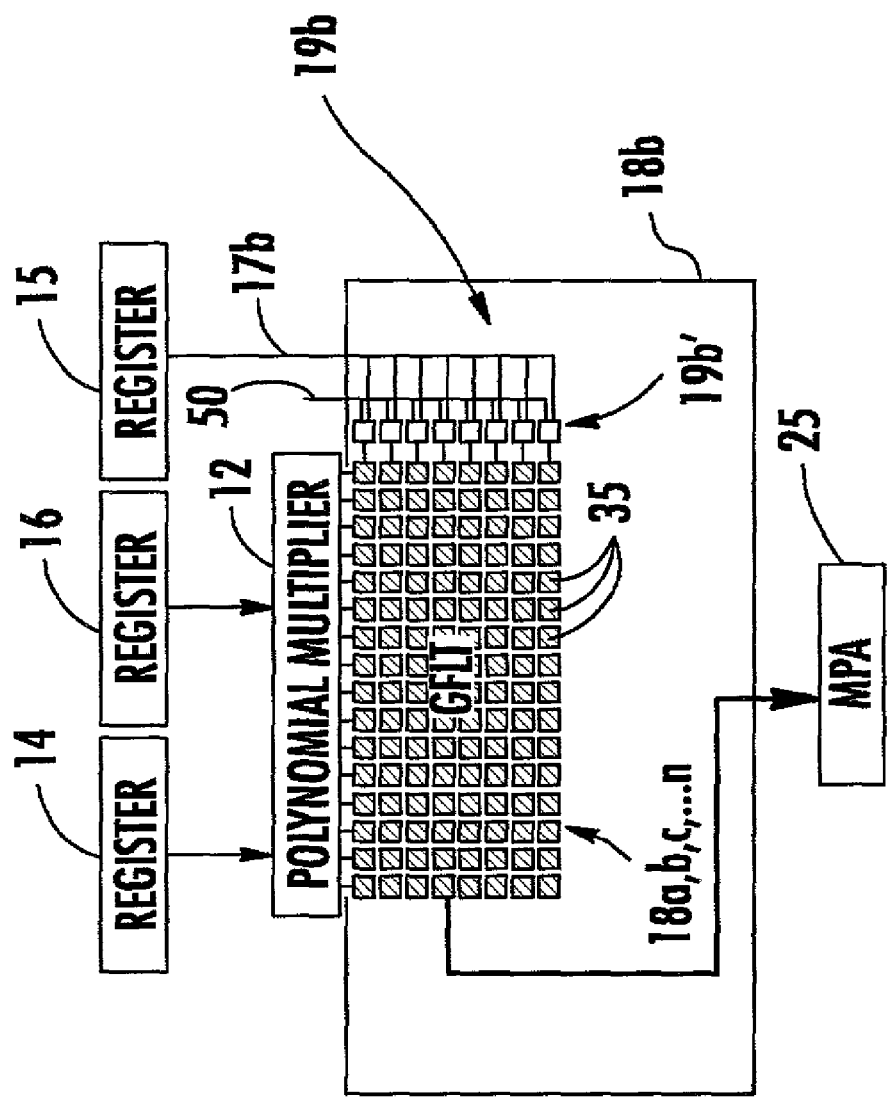
FIG. 8 is a diagram similar to FIG. 2 of another construction of the Galois field multiply/multiply-add/multiply-accumulate system according to this invention.

In this instance the grounded connections 31, FIG. 3 are removed and instead the connection is made at 19a with the input on line 17a so that the adder circuitry includes simply line 17a and the connections 19a to perform the multiply and add or multiply and accumulate all in one cycle. However, if straight multiplication without addition is desired, then input registers circuit 15 should hold the additive identity property for addition "0" and the add operation is nulled. In a slightly less simple implementation, FIG. 8, adder circuit 19b includes in addition to the input line 17b a number of gate 19'b which receive the inputs form line 17b and are in turn each one connected to a different input of the first cell 35 in Galois field linear transformer circuit 18. The signal on line 50 conditions each gate to pass or not pass the value from the polynomial stored in register 15. If straight multiplication without addition is desired then all of the gates 19'b can be disabled. With the gates enabled the polynomial in register 15 will be added to the product of the multiplication of the polynomials in registers 14 and 16. This use of the first cells 35 in Galois field linear transformer circuit 18 is more fully shown and explained in the U.S. patent application entitled PROGRAMMABLE DATA ENCRYPTION ENGINE, by Stein et al., Ser. No. 10/170,267, filed Jun. 12, 2002, publication No. US 2003/0103626 A1, incorporated herein by this reference.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A Galois field multiply/multiply-add/multiply-accumulate system comprising:
   a multiplier circuit for multiplying two polynomials with coefficients over a Galois field to obtain their product;
   a Galois field linear transformer circuit having a plurality of cells and responsive to said multiplier circuit for predicting the modulo remainder of the polynomial product for an irreducible polynomial;
   a storage circuit configured to independently program each of said cells for supplying to said Galois field linear transformer circuit a set of coefficients for predicting the modulo remainder for a predetermined irreducible polynomial; and
   a Galois field adder circuit for adding said product of said multiplier circuit with a third polynomial with coefficients over a Galois field for performing the multiply and add operations in a single cycle.

2. The Galois field multiply/multiply-add/multiply-accumulate system of claim 1 in which said third polynomial is the additive identity polynomial and the add operation is nulled.

3. The Galois field multiply/multiply-add/multiply-accumulate system of claim 1 in which said multiplier circuit product is recursively fed back as the third polynomial and said adder circuit performs a multiply-accumulate operation.

4. The Galois field multiply/multiply-add/multiply-accumulate system of claim 1 in which said multiplication product is delivered to a first output register and the multiply-add/multiply-accumulate result is delivered to a second output register.

5. The Galois field multiply/multiply-add/multiply-accumulate system of claim 1 in which said Galois field adder circuit includes a plurality of adder cells associated with said Galois field linear transformer circuit for combining said third polynomial with the product of the first and second in one cycle.

6. The Galois field multiply/multiply-add/multiply-accumulate system of claim 5 in which said Galois field adder circuit includes a gate associated with each of said adder cells for inhibiting the adding of said third polynomial to the product of said first and second polynomials to null the add operation.

7. A Galois field multiply/multiply-add/multiply-accumulate system comprising:
   a multiplier circuit for multiplying two polynomials with coefficients over a Galois field to obtain their product;
   a Galois field linear transformer circuit responsive to said multiplier circuit for predicting the modulo remainder of the polynomial product for an irreducible polynomial;
   a storage circuit for supplying to said Galois field linear transformer circuit a set of coefficients for predicting the modulo remainder for a predetermined irreducible polynomial; and
   a Galois field adder circuit for adding said product of said multiplier circuit with a third polynomial with coefficients over a Galois field for performing the multiply and add operations in a single cycle, said multiplication product delivered to a first output register and the multiply-add/multiply-accumulate result delivered to a second output register.

8. A Galois field multiply/multiply-add/multiply-accumulate system comprising:
   a multiplier circuit for multiplying two polynomials with coefficients over a Galois field to obtain their product;
   a Galois field linear transformer circuit responsive to said multiplier circuit for predicting the modulo remainder of the polynomial product for an irreducible polynomial;
   a storage circuit for supplying to said Galois field linear transformer circuit a set of coefficients for predicting the modulo remainder for a predetermined irreducible polynomial; and
   a Galois field adder circuit for adding said product of said multiplier circuit with a third polynomial with coefficients over a Galois field for performing the multiply and add operations in a single cycle, said Galois field adder circuit including:
      a plurality of adder cells associated with said Galois field linear transformer circuit for combining said third polynomial with the product of the first and second in one cycle, and
      a gate associated with each of said adder cells for inhibiting the adding of said third polynomial to the product of said first and second polynomials to null the add operation.

* * * * *